United States Patent
Boecker et al.

(10) Patent No.: US 7,895,376 B2
(45) Date of Patent: Feb. 22, 2011

(54) HARDWARE CONFIGURATION INFORMATION SYSTEM, METHOD, AND COMPUTER PROGRAM PRODUCT

(75) Inventors: Douglas Michael Boecker, Rochester, MN (US); Thomas Joseph Warne, Eyota, MN (US); Gregory Michael Nordstrom, Pine Island, MN (US); Diane Lacey Knipfer, Rochester, MN (US); Paul Henry Prahl, Jr., Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 171 days.

(21) Appl. No.: 12/324,329

(22) Filed: Nov. 26, 2008

(65) Prior Publication Data

US 2010/0131685 A1 May 27, 2010

(51) Int. Cl.
*G06F 13/00* (2006.01)
*G06F 9/00* (2006.01)
*G06F 15/177* (2006.01)
(52) U.S. Cl. ............... 710/104; 713/1; 713/2
(58) Field of Classification Search .......... 710/104
See application file for complete search history.

(56) References Cited

U.S. PATENT DOCUMENTS

| | | | | |
|---|---|---|---|---|
| 5,987,548 | A * | 11/1999 | Dixon | 710/104 |
| 6,754,817 | B2 * | 6/2004 | Khatri et al. | 713/1 |
| 6,957,347 | B2 | 10/2005 | Braam et al. | |
| 7,065,638 | B1 * | 6/2006 | Chlytchkov | 713/1 |
| 7,433,983 | B2 * | 10/2008 | Lu | 710/104 |
| 2004/0030875 | A1 * | 2/2004 | Qureshi et al. | 713/1 |
| 2005/0060526 | A1 * | 3/2005 | Rothman et al. | 713/1 |
| 2008/0120451 | A1 * | 5/2008 | Kolvick et al. | 710/301 |
| 2009/0276786 | A1 * | 11/2009 | Bavaria et al. | 718/104 |
| 2009/0282416 | A1 * | 11/2009 | Bavaria et al. | 718/104 |

\* cited by examiner

*Primary Examiner*—Ryan M Stiglic
(74) *Attorney, Agent, or Firm*—Matthew B. Talpis; James L. Baudino (57) ABSTRACT

A method for determining configuration information to be reported comprises accessing a table corresponding to a configuration resource associated with the configuration information, wherein the table comprises an entry for each hardware configuration definition to be built for the configuration resource, identifying a seed value in the table corresponding to the configuration resource, and modifying the seed value based on a result of processing each entry indicated by the table.

20 Claims, 5 Drawing Sheets

HARDWARE CONFIGURATION TABLE(S) — 152

PCI HOST BUS CONFIGURATION TABLE
158

| | | 130a GPIO | 130b GPIO | 130c GPIO | 130d GPIO | 130e GPIO |
|---|---|---|---|---|---|---|
| 162 | RESOURCE INDICATOR | 4300 | | | | |
| 164 | DATA TYPE INDICATOR | phb | | | | |
| 160 | STARTING SEED VALUE | 00007000 | | | | |
| 166 | NUMBER OF DATA ENTRIES | n:5 | | | | |
| 168 | DEVICE SPECIFIC INFORMATION | L,/dev/gpio/0/0/20/0,29 | L,/dev/gpio/0/0/20/0,25 | L,/dev/gpio/0/0/20/0,24 | L,/dev/gpio/0/0/20/0,23 | L,/dev/gpio/0/0/20/0,22 |
| 170 | POLARITY INDICATOR | 0 | 0 | 0 | 0 | 0 |
| 172 | REPORTING POSITION INDICATOR | 15 | 7 | 6 | 5 | 4 |

HARDWARE CONFIGURATION TABLE(S)

PCI HOST BUS CONFIGURATION TABLE

4300:phb:00007000:n:5:gpio:L,/dev/gpio/0/0/20/0,29:0:15:gpio:L,/dev/gpio/0/0/20/0,25:0:7:gpio:L,/dev/gpio/0/0/20/0,24:0:6:gpio:L,/dev/gpio/0/0/20/0,23:0:5:gpio:L,/dev/gpio/0/0/20/0,22:0:4

FIG. 4

HARDWARE CONFIGURATION INFORMATION SYSTEM, METHOD, AND COMPUTER PROGRAM PRODUCT

BACKGROUND

Hardware configuration information for a computer system is determined using system-embedded code. For example, the embedded code for the system platform may collect product data for various hardware resources of the system platform and pass that information to the operating system. The operating system may then use the product data to determine the configuration information needed to support the hardware resources.

BRIEF SUMMARY

According to one embodiment of the present disclosure, a method, system, and computer program product for determining hardware configuration information is disclosed. The method comprises determining the configuration information to be reported. The method further comprises accessing a table corresponding to a configuration resource associated with the configuration information. The method also comprises building the configuration information based on a process indicated by the table.

DETAILED DESCRIPTION

Embodiments of the present disclosure may be embodied as a system, method or computer program product. Accordingly, embodiments of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
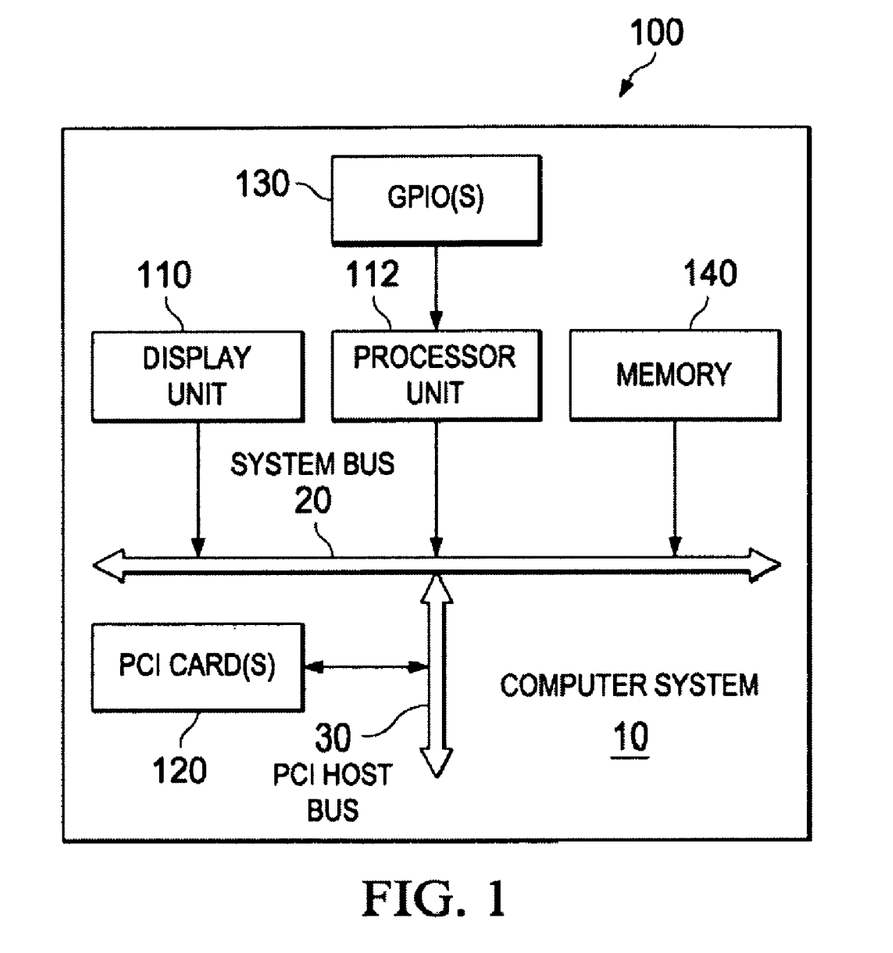
FIG. 1 is a block diagram of an embodiment of a computer system in which embodiments of a hardware configuration information system may be implemented.

With reference now to the figures and in particular with reference to FIG. 1, an exemplary diagram of a computer system environment is provided in which illustrative embodiments may be implemented. It should be appreciated that FIG. 1 is only exemplary and is not intended to assert or imply any limitation with regard to the environment in which different embodiments may be implemented. Many modifications to the depicted environment may be made.

Embodiments of the present disclosure provide a system, method and computer program product for determining and/or reporting hardware configuration information using a generic embedded code configured to be used with any system platform (e.g., platform-independent). The generic embedded code eliminates the need for system platform-specific code to be written and/or updated each time a new version and/or alternative hardware resource is replaced/added into the system platform. The generic embedded code reads and processes information contained in a hardware configuration table to dynamically determine the embedded and/or pluggable resources associated with the system platform. Thus, embodiments of the present disclosure can provide hardware configuration information for a variable number of hardware resources comprising a variable number of configurations without having to write and/or update the generic embedded code. Additionally, the generic embedded code can be used with a number of different combinations of different system processors having different processor unit configurations (e.g., desktop computer systems configured only with a system processor, server systems configured with both a system processor and a flexible service processor, etc.). The flexibility of the hardware configuration tables enables the system platform to determine, identify, and map appropriate support components/devices for the detected hardware resources.

FIG. 1 is a block diagram of an embodiment of a computer system 10 in which embodiments of a hardware configuration information system 100 may be implemented. Computer system 10 may comprise any type of portable or non-portable electronic device, including, but not limited to, a desktop computer, a laptop computer, a notebook computer, a tablet computer, a personal digital assistant (PDA), a cellular phone or any other type of portable and/or non-portable electronic device.

In this embodiment, computer system 10 includes system bus 20, which provides communications between display unit 110, processor unit 112, memory 140, and Peripheral Component Interface (PCI) host bus 30. Processor unit 112 serves to execute instructions for software that may be loaded into memory 140. Processor unit 112 may be a set of one or more processors or may be a multi-processor core, depending on the particular implementation. Further, processor unit 112 may be implemented using one or more heterogeneous processor systems in which a main processor is present with secondary processors (e.g., a flexible service processor) on a single chip. As another illustrative example, processor unit 112 may be a symmetric multi-processor system containing multiple processors of the same type. Processor unit 112 is coupled to General Purpose Input/Output(s) (GPIO(s)) 130. GPIOs 130 is a set of one or more general purpose inputs or general purpose outputs that, in some embodiments, may be used to describe the type of and/or configuration of a device/component (e.g., PCI card(s) 120) coupled thereto. In some embodiments, memory 140 may be a random access memory or any other suitable volatile or non-volatile storage device.

PCI host bus (PHB) 30 provides communications between system bus 20 and PCI card(s) 120. PCI card(s) 120 is a set of one or more cards that provide a variety of features to computer system 10. It should be understood that PCI card(s) 120 can be any type of expansion card, including, but not limited to, a video card, a network card, a sound card, a modem, a Universal Serial Bus port, a serial port, and a tuner card.

The different components illustrated for computer system 10 are not meant to provide architectural limitations to the manner in which different embodiments may be implemented. The different illustrative embodiments may be implemented in a computer system including components in addition to or in place of those illustrated for computer system 10. Other components shown in FIG. 1 can be varied from the illustrative examples shown. For example, a storage device in computer system 10 is any hardware apparatus that may store data. Memory 140 is an example of a storage device in a tangible form.

Figure 2:
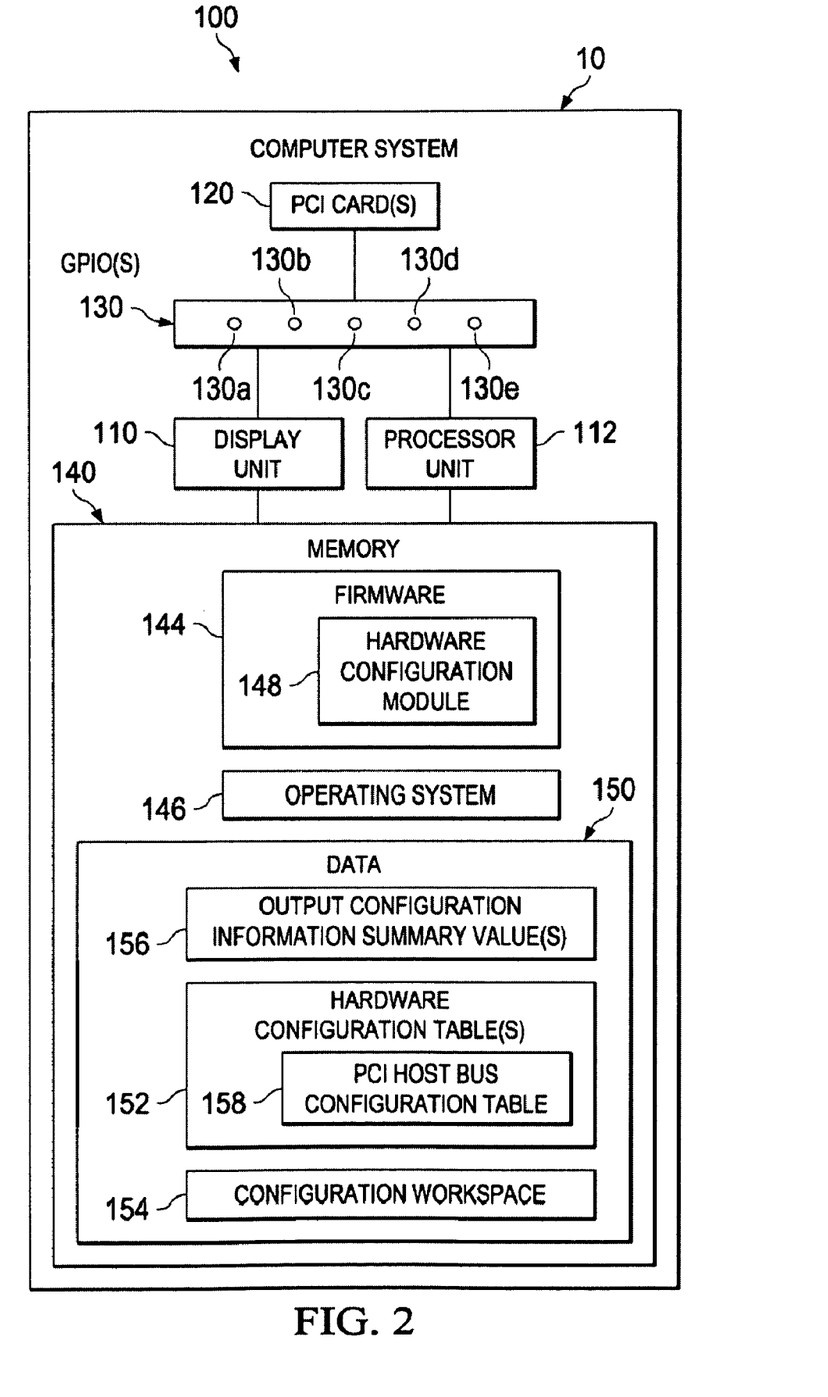
FIG. 2 illustrates a block diagram of an embodiment of a hardware configuration information system.

FIG. 2 is a block diagram of an embodiment of a hardware configuration information system 100. Hardware configuration information system 100 is configured to enable computer system 10 to automatically determine and/or report hardware configuration information for both embedded and pluggable hardware resources for computer system 10. An "embedded hardware resource" is a static, unchanging, non-variable hardware resource that is not intended to be interchanged and/or replaced in computer system 10 (e.g., a motherboard). A "pluggable hardware resource" is a variable hardware resource configured to be interchangeable and/or replaced based on a user's customized specifications (e.g., PCI card(s) 120, a cable, etc.). Computer system 10 uses the hardware configuration information to determine, identify, and/or otherwise map the corresponding components/resources in computer system 10 to support the embedded and pluggable hardware resources. In this embodiment, hardware configuration information comprises information identifying and describing the configurations and/or features of a hardware resource, such as, but not limited to, the hardware resource type, the serial number or port number of the hardware resource, the operating capacity of the hardware resource, etc. It should be understood that a hardware resource can be any hardware component/device used by computer system 10, including, but not limited to PCI host bus 30, PCI card(s) 120, an interposer card, a cable, etc.

Hardware configuration information system 100 comprises display unit 110, processor unit 112, PCI card(s) 120, GPIO(s) 130, and memory 140. PCI card(s) 120, for example, is a type of pluggable hardware resource configured to interface with display unit 110 and/or processor unit 112. GPIO(s) 130 is used as a configuration indicator to describe and/or identify PCI card(s) 120 and/or a characteristic/configuration thereof. A "configuration indicator" identifies whether a particular characteristic/configuration is active or inactive for the respective hardware resource. In FIG. 2, configuration indicators are "active" when the configuration indicator (e.g., GPIO(s) 130) outputs a high voltage signal and "inactive" when the configuration indicator outputs a low voltage signal.

In the illustrated embodiment, GPIO(s) 130 comprises five inputs/outputs, namely, GPIOs 130a, 130b, 130c, 130d, and 130e. In some embodiments, the signals corresponding to GPIOs 130a through 130e are used to describe and/or identify a characteristic/configuration of PCI card(s) 120. In some embodiments, a combination of signals from two or more GPIOs 130a through 130e are configured to describe and/or identify PCI card(s) 120 and/or a characteristic/configuration of PCI card(s) 120.

In FIG. 2, memory 140 comprises firmware 144, an operating system 146, and data 150. In some embodiments, firmware 144 is configured to operate within a hypervisor to enable processor unit 112, (e.g., the main processor) to determine, identify, and/or otherwise map the corresponding components/resources in accordance with the hardware configuration information for computer system 10. In FIG. 2, firmware 144 comprises hardware configuration module 148, which is a set of executable instructions, commands, and/or algorithms configured to determine and/or report the hardware configuration information for the embedded and pluggable resources for computer system 10. For example, hardware configuration module 148 determines and/or reports the active hardware resources and/or the configurations thereof to operating system 146, thereby enabling processor unit 112 to set-up and/or establish the appropriate components/resources associated with the active hardware devices. For example, in the illustrated embodiment, hardware configuration module 148 identifies and/or describes PCI card(s) 120 and/or the characteristics/configurations thereof in order to determine, identify, and/or otherwise map the corresponding components/resources associated with PHB 30 (FIG. 1) that are needed to support PCI card(s) 120. However, it should be understood that hardware configuration module 148 can also identify and/or describe other types of hardware resources interfacing with computer system 10. For example, hardware configuration module 148 can identify the different types of cables interfacing with computer system 10 to determine, identify, and/or otherwise map corresponding components/resources for the cables interfacing with computer system 10.

In the illustrated embodiment, data 150 comprises hardware configuration table(s) 152, configuration workspace(s) 154, and output configuration information summary value(s) 156. In some embodiments, hardware configuration table(s) 152 comprises one or more tables used to identify and/or describe the various hardware resources (e.g., embedded devices, on-board devices, peripheral devices, PCI cards, etc.) interfacing with computer system 10. Hardware configuration table(s) 152 is a customized, static, pre-populated table used to enable hardware configuration module 148 to determine and/or report the hardware configuration information for the embedded and pluggable hardware resources for computer system 10. For example, in FIG. 2, hardware configuration table(s) 152 comprises a PCI host bus configuration table 158 configured to enable hardware configuration module 148 to determine and/or report configuration information for PCI card(s) 120 for computer system 10. Specifically, in this exemplary embodiment, PCI host bus configuration table 158 enables hardware configuration module 148 to gather information from GPIO(s) 130 for PCI card(s) 120 and use the information to report and/or describe the configurations for PCI card(s) 120.

Configuration workspace 154 is a storage area for intermediary values of information gathered based on hardware configuration table(s) 152 that are being processed by hardware configuration module 148. In other words, configuration workspace 154 is configured as a work in progress storage area for the hardware configuration information as the information is being gathered and/or read by hardware configuration module 148. For example, in some embodiments, configuration workspace 154 may comprise a numeric value counting down the number of configuration indicators left to process based on hardware configuration table(s) 152. In another example, configuration workspace 154 may comprise an intermediate configuration summary value reflecting the configuration indicators that have been read and/or identified.

In FIG. 2, output configuration information summary value(s) 156 is a processed and/or updated value identifying the embedded hardware and pluggable hardware resources interfacing with computer system 10. Thus, in the illustrated embodiment, output configuration information summary value(s) 156 is a value reflecting the embedded hardware as well as the configuration information for PCI card(s) 120. In FIG. 2, firmware 144 and operating system 146 uses output configuration information summary value(s) 156 to determine, identify, and/or otherwise map corresponding components/resources to the embedded hardware and pluggable hardware resource interfacing with computer system 10.

Thus, in operation, in some embodiments, firmware 144 executes hardware configuration module 148 during initialization of computer system 10; however, it should be understood that hardware configuration module 148 may also be executed at other times. After initialization, hardware configuration module 148 accesses a particular configuration table 152, based on the particular resource configuration information that is sought. For example, for PCI host bus 30, hardware configuration module 148 requests hardware configuration information for PCI card(s) 120 for PHB bus 30. Hardware configuration module 148 begins reading PCI Host Bus configuration table 158 to identify the configuration indicators to read to determine and/or identify the active and inactive characteristics/components of PCI card(s) 120 and/or the active and inactive state of PCI card(s) 120. In this example, PCI Host Bus configuration table 158 identifies GPIO(s) 130a through 130e as the configuration indicators for PCI card(s) 120 and, therefore, hardware configuration module 148 reads an active and/or inactive state of each of GPIO(s) 130a through 130e. Hardware configuration module 148 moves a portion of the values in PCI host bus configuration table 158 to configuration workspace 154 so that the values can be processed and/or updated as the active and/or inactive states of GPIO(s) 130a through 130e are determined. The states for GPIO(s) 130a through 130e are determined and the values in configuration workspace 154 are updated. Then, the updated values from configuration workspace(s) 154 are output as output configuration information summary value(s) 156 to be used by firmware 144 and operating system 146 to determine, identify, and/or otherwise map the corresponding components and/or devices to support the active hardware resources.

Figure 3A:
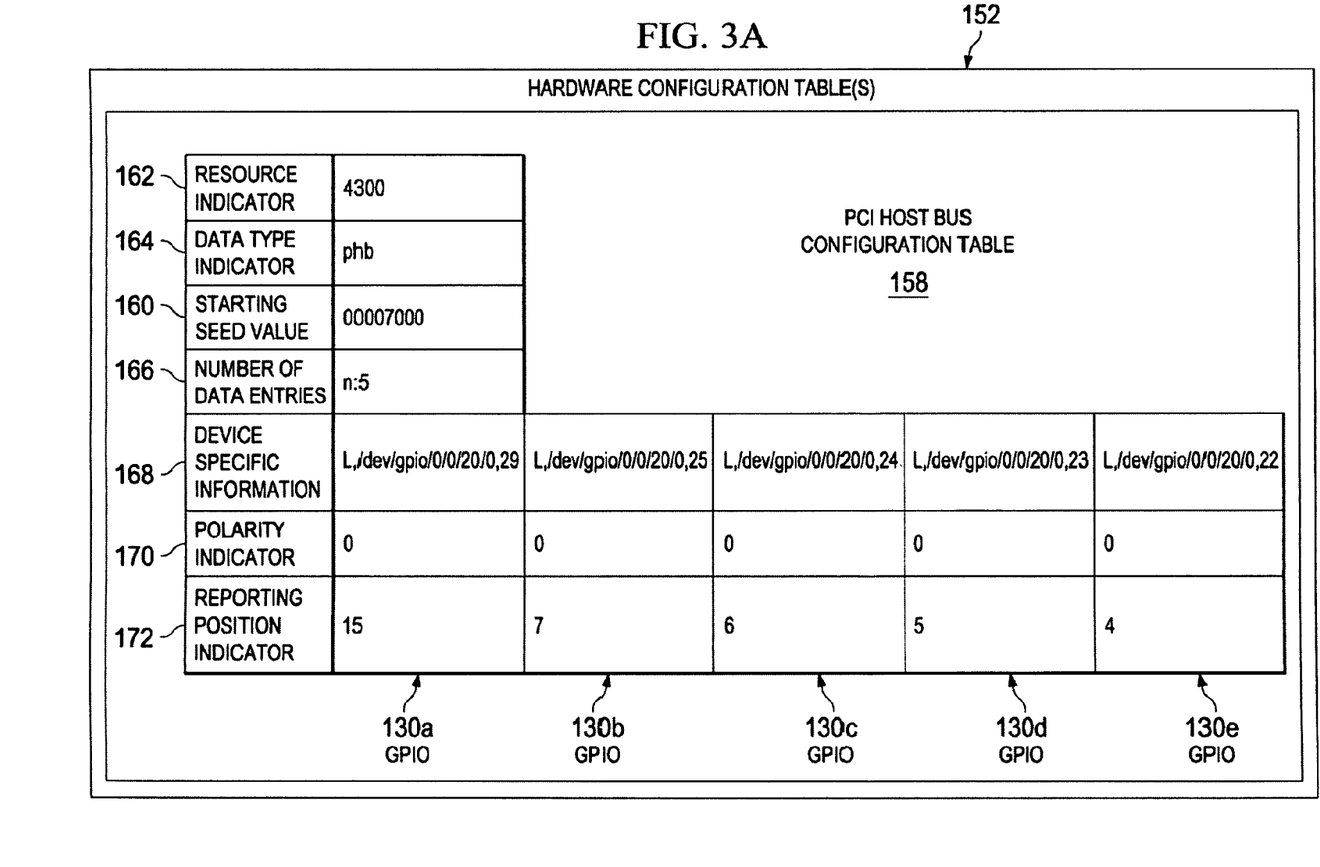
FIGS. 3A and 3B illustrate an embodiment of a hardware configuration table for the hardware configuration information system of FIG. 2.
Figure 3B:
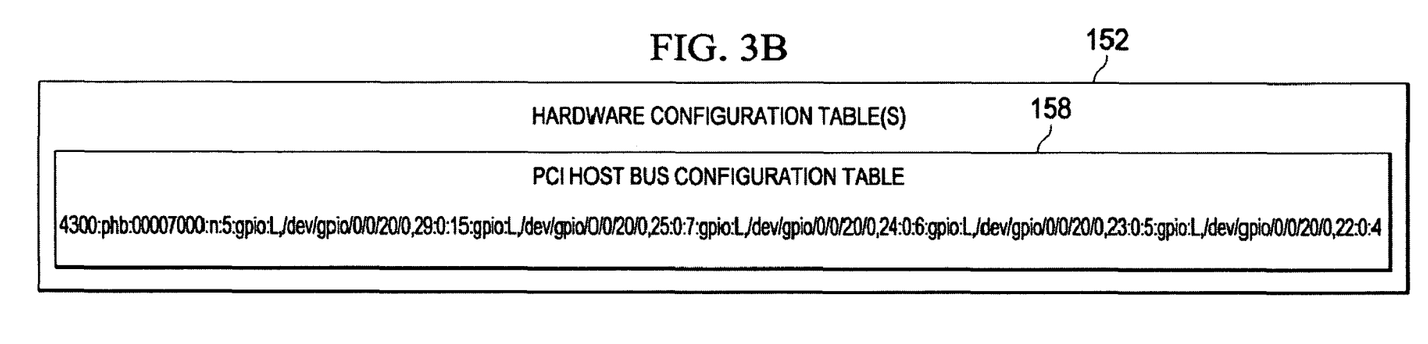

FIGS. 3A and 3B illustrate an embodiment of hardware configuration table(s) 152 for hardware configuration information system 100 of FIG. 2. FIG. 3A illustrates an exemplary embodiment of PCI host bus configuration table 158 for hardware configuration table(s) 152. PCI host bus configuration table 158 comprises a customized, static, pre-populated table used to enable hardware configuration module 148 (FIG. 2) to determine and/or report hardware configuration information for PCI card(s) 120. In FIG. 3A, PCI host bus configuration table 158 comprises a starting seed value 160, a resource indicator 162, a data type indicator 164, a number of data entries 166, device specific information 168, a polarity indicator 170, and a reporting position indicator 172. Starting seed value 160 is a value used to identify the embedded hardware resources within computer system 10. For example, in FIG. 3A, starting seed value 160 is a hexadecimal value "00007000," which reflects and/or describes the hardware configuration information for the embedded hardware resources of computer system 10 (FIG. 1); however, it should be understood that starting seed value 160 can be in any format, including, but not limited to, a character string, an array, a 64-bit binary value, or an 8-bit binary value. In some embodiments, starting seed value 160 is configured to be processed, updated and/or combined with other configuration indicators (e.g., based on read values associated with GPIOs 130a through 130e of FIG. 1) to identify the additional pluggable hardware resources (e.g., peripheral devices, PCI card(s) 120, etc.) interfacing with computer system 10. In some embodiments, seed value 160 represents and/or otherwise indicates resources of the platform that are embedded and/or non-variable, thereby indicating that certain non-variable resources are present and/or enabled. As will be described further below, seed value 160 is updated/modified to indicate both the resources that are embedded/non-variable in the platform and those resources that have been added to the platform (e.g., plugged in and/or a variable resource that is present in the platform).

Resource indicator 162 is a reference numeral identifying the hardware resource (e.g., PCI host bus 30, etc.) for which PCI host bus configuration table 158 applies. In some embodiments, resource indicator 162 is customized for computer system 10 and can be designated and/or assigned by a user and/or administrator of computer system 10. Data type indicator 164 is a character string corresponding to resource indicator 162. In FIG. 3A, resource indicator 162 is identified as "4300" and datatype indicator 164 is "phb." Thus, in the illustrated embodiment, "4300" refers to the resource of the PHB host bus 30 and "phb" refers to PHB host bus 30.

Number of data entries 166 identifies the number of configuration indicators (e.g., the number of GPIOs 130a through 130e) to process for PCI host bus configuration table 158. For example, in the illustrated embodiment, number of data entries 166 comprises a value of "n:5," reflecting the number (as indicated by the character "n") of GPIOs 130a through 130e in computer system 10 to be read/processed to identify and/or describe PCI card(s) 120 (in this example, five). In some embodiments, each data entry identified in number of data entries 166 in PCI host bus configuration table 158 represents a single hardware resource (e.g., one of PCI card(s) 120). In some embodiments, each data entry describes an entire and/or a portion of a hardware resource and/or a characteristic/configuration of the hardware resource. Number of data entries 166 is configured to enable a variable number of hardware resources (e.g., any number designated by a user and/or administrator of computer system 10) to interface with computer system 10. Number of data entries 166 is also configured to enable a variable number of characteristics/configurations to describe a particular hardware resource.

Device specific information 168 is the information to be read by hardware configuration module 148 for each of the entries identified in PCI host bus configuration table 158. For example, in some embodiments, device specific information 168 identifies the address and/or signal path for GPIOs 130a through 130e. In FIG. 3A, each device specific information 168 begins with an "L" character following the word "gpio." Thus, for example, device specific information 168 for GPIO 130a in PCI host bus configuration table 158 is "L,/dev/gpio/0/0/20/0,29." It should be understood, however, that device specific information 168 may also begin with and/or contain other characters/symbols/information/files to describe the associated hardware resource.

Polarity indicator 170 identifies how to interpret the signal read from GPIOs 130a through 130e for PCI host bus configuration table 158 located at device specific information 168. For example, GPIOs 130a through 130e transmits a signal in which computer system 10 interprets as a "true" or "false" electrical value. Thus, in the illustrated embodiment, a "true" electrical value indicates that an active high signal is present (e.g., an electrical signal generating a high voltage value). A "false" electrical value indicates that an active low signal is present (e.g., an electrical signal generating a low voltage value). In some embodiments, the electrical values are represented as a binary bit value (e.g., as a "0" or "1"). Thus, for example, a "true" electrical value is represented as a "1" bit value, while a "false" electrical value is represented as a "0" bit value. However, it should be understood that, in some embodiments, the electrical values may be interpreted oppositely (e.g., a "1" bit value representing a "false" value and a "0" bit value representing a "true" value).

In this embodiment, polarity indicator 170 identifies whether the signal returned from GPIOs 130a through 130e should be interpreted and then subsequently reported as a "0" or a "1" value. Thus, if polarity indicator 170 is set to "0," then the value associated with the signal read from each of GPIOs 130a through 130e should be inverted. On the other hand, if polarity indicator 170 is set to "1," then the value associated with the signal read from each of GPIOs 130a through 130e is the interpreted value and is not inverted. In the illustrated embodiment, polarity indicator 170 is a "0" bit value for each of GPIOs 130a through 130e, thereby indicating that the values associated with the signals read from GPIOs 130 need to be inverted.

In the illustrated embodiment, reporting position indicator 172 identifies how the value read/derived from each of the configuration indicators is to be reflected and combined with starting seed value 160. Specifically, reporting position indicator 172 identifies the position and/or the location of the binary value in starting seed value 160 to process and/or update based on the values associated with GPIO(s) 130a through 130e. Thus, for example, the hexadecimal value "00007000" for starting seed value 160 corresponds to "0000 0000 0000 0000 0111 0000 0000 0000" in bit form. In other words, each hexadecimal value is described and/or identified by four bits. Thus, in the illustrated embodiment, a "0" value corresponds to "0000" and the "7" value corresponds to "0111." The right-most position of starting seed value 160 in bit form is designated as the "0th" position. Reporting position indicator 172 for GPIO 130a is "15," thereby indicating that the value associated with GPIO 130a should be reflected in the 15th position of starting seed value 160. The right most bit of starting seed value 160 is the 0th position. Thus, the 15th position is identified by starting from the 0th position and shifting 15 places to the left of the 0th position. Therefore, in the illustrated embodiment, the 15th position is located within the value "7" or corresponding to the "0111" bit group. Specifically, the 15th position is the "0" in the "0111" bit group.

As indicated above, polarity indicator 170 identifies how to interpret the signals read from each of GPIOs 130a through 130e. In FIG. 3A, polarity indicator 170 for GPIOs 130a through 130e is a "0," thereby indicating that the values associated with the signals read from GPIOs 130a through 130e should be inverted and "or"ed into starting seed value 160 at the location identified by reporting position indicator 172. Thus, for example, in the illustrated embodiment, if hardware configuration module 148 reads a low voltage signal on GPIO 130a, the signal is interpreted as a "0" value. Since polarity indicator 170 for GPIO 130a is a "0" value, then the "0" value associated with GPIO 130a is inverted to a "1" value. The "1" value is then "or"ed into the 15th position (as indicated by reporting position indicator 172) for starting seed value 160. Thus, the "0" in the "0111" bit group is "or"ed or changed to a "1" value and output as "1111." Similarly, if hardware configuration module 148 reads a high voltage signal on GPIO 130a, the signal is interpreted as a "1" value, then the "1" value is inverted to a "0" value and "or"ed into the 15th position for starting seed value 160. In this example, the output of the updated seed value is "0111," which is the same as starting seed value 160.

Thus, in operation, starting seed value 160 is processed and/or updated in the same manner for GPIOs 130b through 130e and/or any other entries identified by number of data entries 166. In this embodiment, since polarity indicator 170 for GPIOs 130b through 130e is "0," the values interpreted from the signals associated with GPIOs 130b through 130e will be inverted and then "or"ed into starting seed value 160 at corresponding reporting position indicator 172. Thus, starting seed value 160 is updated at the "7th" position for GPIO 130b, the "6th" position for GPIO 130c, the "5th" position for GPIO 130d, and the "4th" position for GPIO 130e.

FIG. 3B illustrates an exemplary ordered read sequence of the information contained in PCI Host Bus Configuration Table 158 of hardware configuration table(s) 152. In FIG. 3B, PCI host bus configuration table 158 comprises the following table entry:

4300:phb:00007000:n:5:gpio:L,/dev/gpio/0/0/20/0,29:0:15:gpio:L,/dev/gpio/0/0/2 0/0,25:0:7:gpio:L,/dev/gpio/0/0/20/0,24:0:6:gpio:L,/dev/gpio/0/0/20/0,23:0:5:gpio/0/0/20/0,22:0:4

In some embodiments, hardware configuration module 148 parses through the table entry starting from the left and moving towards the right. Hardware configuration module 148 begins reading the entry at resource indicator 162 ("4300") and moving to the right to data type indicator 164 ("phb"). Number of data entries 166 (n:5) follows thereafter. Device specific information 168 for GPIO 130a is the first configuration indicator listed, with device specific information 168 for GPIOs 130b through 130e following thereafter.

It should be understood, however, that PCI host bus configuration table 158 may be customized based on the type of hardware resources being described. Thus, in some embodiments, PCI host bus configuration table 158 may comprise more, fewer, and/or other information than illustrated by FIGS. 3A and 3B. Furthermore, in some embodiments, PCI host bus configuration table 158 may comprise a different configuration and present information and/or data in a different order than illustrated by FIGS. 3A and 3B.

Figure 4:
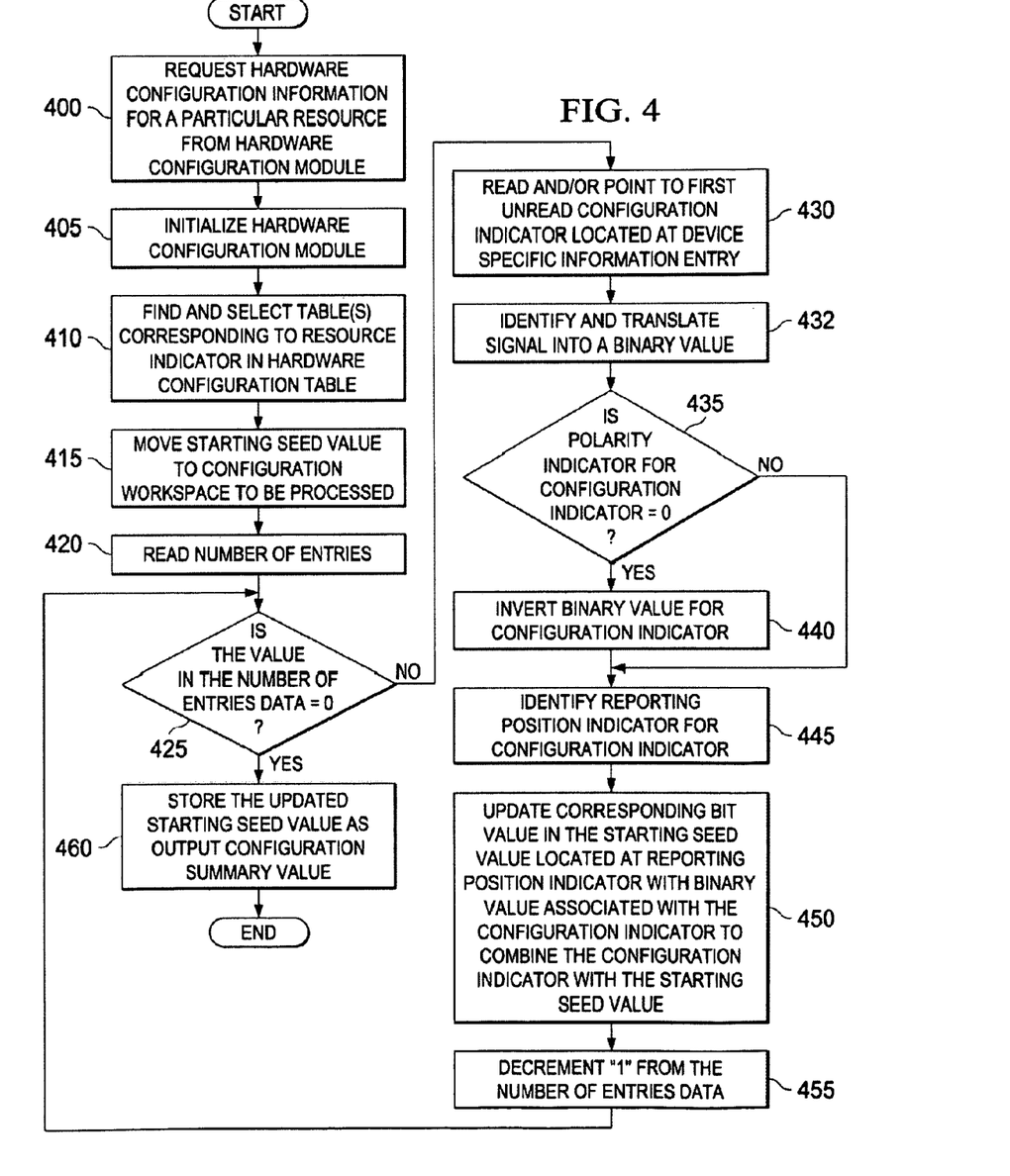
FIG. 4 is a flow chart illustrating an embodiment of a method for determining and/or reporting hardware configuration information for the hardware configuration system of FIG. 2.

FIG. 4 is a flow chart illustrating an embodiment of a method for determining and/or reporting hardware configuration information for both embedded and pluggable hardware resources for hardware configuration system 100 of FIG. 2. The method begins at block 400 where firmware 144 requests hardware configuration information for a particular resource, such as PCI host bus 30, from hardware configuration module 148. Hardware configuration module 148 is initialized (block 405) and then finds and selects the table(s) in hardware configuration table(s) 152 corresponding to resource indicator 162 (e.g., "4300" in PCI host bus configuration table 158 corresponding to PCI host bus 30) (block 410). Hardware configuration module 148 then moves starting seed value 160 to configuration workspace 154 to be processed (block 415). Hardware configuration module 148 then reads number entries data 166 to determine the number entries needed to be read in hardware configuration table(s) 152 (block 420). Hardware configuration module 148 then determines whether the number of entries data is equal to "0" (decision block 425). If number of entries is not equal to "0" ("no" output to decision block 425), then hardware configuration module 148 reads and/or points to the first unread configuration indicator located at device specific information 168 (e.g., device specific information 168 for GPIO 130a) (block 430) and identifies whether a received signal from the configuration indicator is active and/or inactive (e.g., active high or active low signal from GPIO 130a) and translates the received signal into a binary value (decision block 432). Hardware configuration module 148 then determines whether polarity indicator 170 for the corresponding entry has value of "0" (decision block 435). If the polarity indicator has a value of "0" ("yes" output to decision block 335), then hardware configuration module 148 inverts the binary value associated with the configuration indicator (e.g., GPIO 130a) (block 440). Hardware configuration module 148 then identifies reporting position indicator 172 for the corresponding configuration indicator (block 445) and updates the corresponding bit value in starting seed value 160 located at reporting position indicator 172 with the binary value associated with the configuration indicator to combine the corresponding configuration indicator with starting seed value 160 (block 450). Hardware configuration module 148 then decrements the number of entries data 166 by the value of "1" (block 455), with the method repeated beginning with decision block 425.

Returning to decision block 435, if polarity indicator 170 for the corresponding entry is "1" ("no" output to decision block 335), hardware configuration module 148 then identifies reporting position indicator 172 for the corresponding configuration indicator (block 445) and updates the corresponding bit value in starting seed value 160 located at reporting position indicator 172 with the binary value associated with the configuration indicator to combine the corresponding configuration indicator with starting seed value 160 (block 450). Hardware configuration module 148 then decrements the number of entries data 166 by the value of "1" (block 455), with the method repeated beginning with decision block 425.

Returning to decision block 425, if the value in number of entries data 166 is equal to "0" ("yes" output to decision block 425), then hardware configuration module 148 stores updated starting seed value 160 from configuration workspace 154 as output configuration information summary value(s) 156 (block 460), with the method completing thereafter.

Thus, embodiments of hardware configuration information system 100 provide a system and a method for determining and/or reporting hardware configuration information using a generic embedded code configured to be used with any system platform. The generic embedded code eliminates the need for system platform specific code to be written and/or updated each time a new version and/or alternative hardware resource is replaced/added into the system platform. The generic embedded code reads and process information based on data contained in a hardware configuration table (e.g., hard configuration table(s) 152) to dynamically determine the embedded and/or pluggable resources associated with each system platform. Thus, embodiments of hardware configuration information system 100 can provide hardware configuration information for a variable number of hardware resources comprising any variable number of configurations without having to write and/or update the generic embedded code. Additionally, the generic embedded code can be used with a number of different combinations of different system processors having different processor unit configurations (e.g., desktop computer systems configured only with a system processor, server systems configured with both a system processor and a flexible service processor, etc.). The flexibility of the hardware configuration tables enables the system platform to determine, identify, and otherwise map appropriate support components/devices for the detected hardware resources.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for determining configuration information for a computer system, the method comprising:
   determining the configuration information to be reported;
   accessing a table corresponding to a configuration resource associated with the configuration information, wherein the table comprises an entry for each hardware configuration definition to be built for the configuration resource;
   identifying a seed value in the table corresponding to the configuration resource; and
   modifying the seed value based on a result of processing each entry indicated by the table.

2. The method of claim 1, further comprising combining the seed value with configuration indicators from the table to build the configuration information.

3. The method of claim 1, further comprising processing the seed value comprising values identifying non-variable resources with values identifying variable resources associated with the computer system.

4. The method of claim 1, further comprising outputting a binary data pattern representing the configuration information.

5. The method of claim 1, further comprising interpreting a signal from a configuration indicator to determine the configuration information to be reported.

6. The method of claim 1, further comprising inverting a value associated with a configuration indicator based on a polarity indicator identified in the table.

7. The method of claim 1, further comprising updating a bit value in the seed value to reflect the configuration information for a configuration indicator based on a reporting position indicator associated with the configuration indicator.

8. The method of claim 1, further comprising determining the configuration information during initialization of the computer system.

9. A hardware configuration information system, comprising:
   a processor unit; and
   a hardware configuration information module executable by the processor unit to determine the configuration information to be reported, access a table corresponding to a configuration resource associated with the configuration information, wherein the table comprises an entry for each hardware configuration definition to be built for the configuration resource, and build the configuration information based on a result of processing each entry indicated by the table by modifying a seed value corresponding to the configuration resource.

10. The system of claim 9, wherein the hardware configuration information module combines the seed value with configuration indicators from the table to build the configuration information.

11. The system of claim 9, wherein the hardware configuration information module processes the seed value comprising values identifying non-variable resources with values identifying variable resources associated with the computer system.

12. The system of claim 9, wherein the hardware configuration information module outputs a binary data pattern representing the configuration information.

13. The system of claim 9, wherein the hardware configuration information module interprets a signal from a configuration indicator to determine the configuration information to be reported.

14. The system of claim 9, wherein the hardware configuration information inverts a value associated with a configuration indicator based on a polarity indicator identified in the table.

15. A computer program product comprising:
   a computer usable storage medium including computer usable program code for determining hardware configuration information for a computer system, the computer program product comprising:
   computer usable program code for determining the configuration information to be reported;
   computer usable program code for accessing a table corresponding to a configuration resource associated with the configuration information, wherein the table comprises an entry for each hardware configuration definition to be built for the configuration resource; and
   computer usable program code for modifying a seed value in the table corresponding to the configuration resource based on a result of processing each entry indicated by the table.

16. The computer program product of claim 15, comprising computer usable program code for combining the seed value with configuration indicators from the table to build the configuration information.

17. The computer program product of claim 15, comprising computer usable program code for processing the seed value comprising values identifying non-variable resources with values identifying variable resources associated with the computer system.

18. The computer program product of claim 15, comprising computer usable program code for outputting a binary data pattern representing the configuration information.

19. The computer program product of claim 15, comprising computer usable program code for interpreting a signal from a configuration indicator to determine the configuration information to be reported.

20. The computer program product of claim 15, comprising computer usable program code for inverting a value associated with a configuration indicator based on a polarity indicator identified in the table.

* * * * *